United States Patent [19]
Yoppolo et al.

[11] Patent Number: 6,143,439
[45] Date of Patent: Nov. 7, 2000

[54] END CAP ASSEMBLY FOR AN ELECTROCHEMICAL CELL

[75] Inventors: Robert A. Yoppolo, Woonsocket, R.I.; Sean A. Sargeant, Westford; Marian Wiacek, Holliston, both of Mass.

[73] Assignee: Duracell, Inc.

[21] Appl. No.: 09/232,517

[22] Filed: Jan. 19, 1999

Related U.S. Application Data

[63] Continuation of application No. 08/897,918, Jul. 21, 1997.

[51] Int. Cl.[7] ........................................... H01M 2/04
[52] U.S. Cl. ............................... 429/91; 429/90; 429/164; 429/170; 429/175
[58] Field of Search .................................. 429/90, 91, 94, 429/175, 163, 164, 170

[56] References Cited

U.S. PATENT DOCUMENTS

| | | | |
|---|---|---|---|
| 5,491,038 | 2/1996 | DePalma et al. | 429/91 |
| 5,532,081 | 7/1996 | DePalma et al. | 429/171 |
| 5,543,246 | 8/1996 | Treger . | |
| 5,612,151 | 3/1997 | Hughen . | |
| 5,614,333 | 3/1997 | Hughen et al. | 429/93 |

*Primary Examiner*—Maria Nuzzolillo
*Assistant Examiner*—Monique M. Wills
*Attorney, Agent, or Firm*—Barry D. Josephs; Paul I. Douglas; Thomas G. Krivulka

[57] ABSTRACT

An end cap assembly for an electrochemical cell, for example an alkaline cell, is disclosed comprising an exposed terminal end cap of single piece construction having a convoluted surface, an electrically insulating member and a metal support disk between the insulating member and the terminal end cap. The end cap assembly is inserted into the open end of the cell housing after the cell contents have been supplied. A portion of the end cap surface is a flat annular step which improves contact between the end cap and the electrically conductive portion of a condition tester for the cell which may be integrated into the cell label. The annular step is advantageously located at about right angle to the cell's longitudinal axis. The surface step is integral with the end cap and preferably located at about the same level as the shoulder of the cell housing at the end of the cell containing the end cap. The end cap assembly as a whole provides a tight seal for the cell.

4 Claims, 4 Drawing Sheets

END CAP ASSEMBLY FOR AN ELECTROCHEMICAL CELL

This application is a continuation of application Ser. No. 08/897,918, filed Jul. 21, 1997 now allowed.

FIELD OF THE INVENTION

The invention relates to end cap assembly for sealing electrochemical cells, particularly alkaline cells. The invention relates to a terminal end cap which provides a good electrical contact surface for condition testers for the cell which are integrated into the cell label.

DESCRIPTION OF THE PRIOR ART

Conventional electrochemical cells, such as alkaline cells, are formed of a cylindrical housing having an open end. After the cell contents are supplied, the cell is closed by crimping the housing edge over the end cap assembly to provide a seal for the cell. The end cap assembly comprises an exposed end cap plate which functions as a cell terminal.

Recently condition testers for electrochemical cells, for example alkaline cells, have been integrated into the label for the cell to form a label/tester composite which is attached to the cell housing. The condition tester may typically be a thermochromic tester, but alternatively it may be an electrochromic tester, electrochemical tester, coulometric tester or equivalent which is attached to the inside surface of the label. The condition tester may have an electrically conductive layer therein. When the ends of the conductive layer are pressed into contact with the cell terminals the conductive layer reaches an equilibrium temperature which is a function of the cell voltage. If the conductive layer becomes hot enough it causes a thermochromic layer of the tester to change appearance thereby giving the viewer a visual indication of whether the cell is strong or weak. A label/tester composite employing a thermochromic type tester for attachment to the cell housing is described in U.S. Pat. Nos. 5,612,151 and 5,614,333, incorporated by reference herein.

In order for the tester to be activated the ends of the conductive layer must either both be manually pressed into contact with the cell terminals or one end of the conductive layer may be permanently connected to one of the cell terminals and other end pressed into contact with the other of the cell terminals. When the label/tester composite is to be applied to conventional alkaline cells, one end of the conductive layer must be either permanently electrically connected to the terminal end cap or else allowed to be manually pressed into electrical contact with the end cap. In U.S. Pat. No. 5,614,333 an embodiment of the label/tester is shown wherein an end of the conductive layer is intended to be manually pressed into contact with the terminal end cap. That conductive end is separated from the terminal end cap by an electrically insulating layer having apertures therethrough. To activated the tester the conductive end is manually pressed through these apertures to contact the terminal end cap by applying finger pressure to the label portion thereover. A ring may be inserted as a separate piece between the peripheral edge of the terminal end cap and the cell's housing to provide a contact platform for the conductive layer or leads emanating therefrom as described in U.S. Pat. No. 5,491,038. The disadvantage is that the ring is inserted as a separate piece. Alternatively, an end of the tester's conductive layer may be permanently secured to the cell's terminal end cap using a conductive adhesive as described in U.S. Pat. No. 5,543,246 also incorporated by reference herein.

Accordingly, it is desirable to have a terminal end cap with a portion of its surface integral therewith and of structure providing good electrical contact with the conductive portion of a label/tester composite regardless of whether permanent or manual contact is desired.

It is also desirable to have an end cap assembly which provides a tight seal for the cell even though the cell may be exposed to extremes in both hot and cold climate.

SUMMARY OF THE INVENTION

The invention is directed to an electrochemical cell, for example an alkaline cell, comprising an end cap assembly inserted into the open end of a cylindrical housing for the cell. The end cap assembly comprises an exposed terminal end cap, an electrically insulating seal and a metal support disk between the insulating seal and the end cap. The terminal end cap of the invention has an integral portion of its surface which is flat and designed to improve contact between the end cap and a conductive portion of a condition tester for the cell which may be integrated into the cell label forming a label/tester composite. The tester is preferably a thermochromic tester, but may be an electrochemical tester, coulometric tester or other tester, for example, an electrochromic tester or electrophorectic tester having a conductive layer therein or leads emanating from the conductive layer which must be either permanently or manually pressed into electrical contact with the terminal end cap. The end cap assembly as a whole is designed to improve the seal at the open end of the housing for the cell by permitting greater compressive radial forces to be applied thereto when the cell housing is radially crimped around the cell assembly.

The terminal end cap has a convoluted surface, a portion of which desirably comprises a surface arm extending upwardly from the central portion of the end cap, as viewed when the cell is in vertical position with the end cap on top, and another surface portion which takes the form of a flat annular step located between the upwardly extending surface arm and the peripheral edge of the terminal end cap. The flat annular step preferably lies at about right angle to the longitudinal axis of the cell and is desirably located at about the same level as the shoulder of the cell housing at the end of the cell having said terminal end cap. The flat annular step portion of the end cap surface so located provides a better contact landing for the electrically conductive portion of the tester.

BRIEF DESCRIPTION OF THE DRAWINGS

The invention will be better understood with reference to the drawings in which.

DETAILED DESCRIPTION

Figure 1:
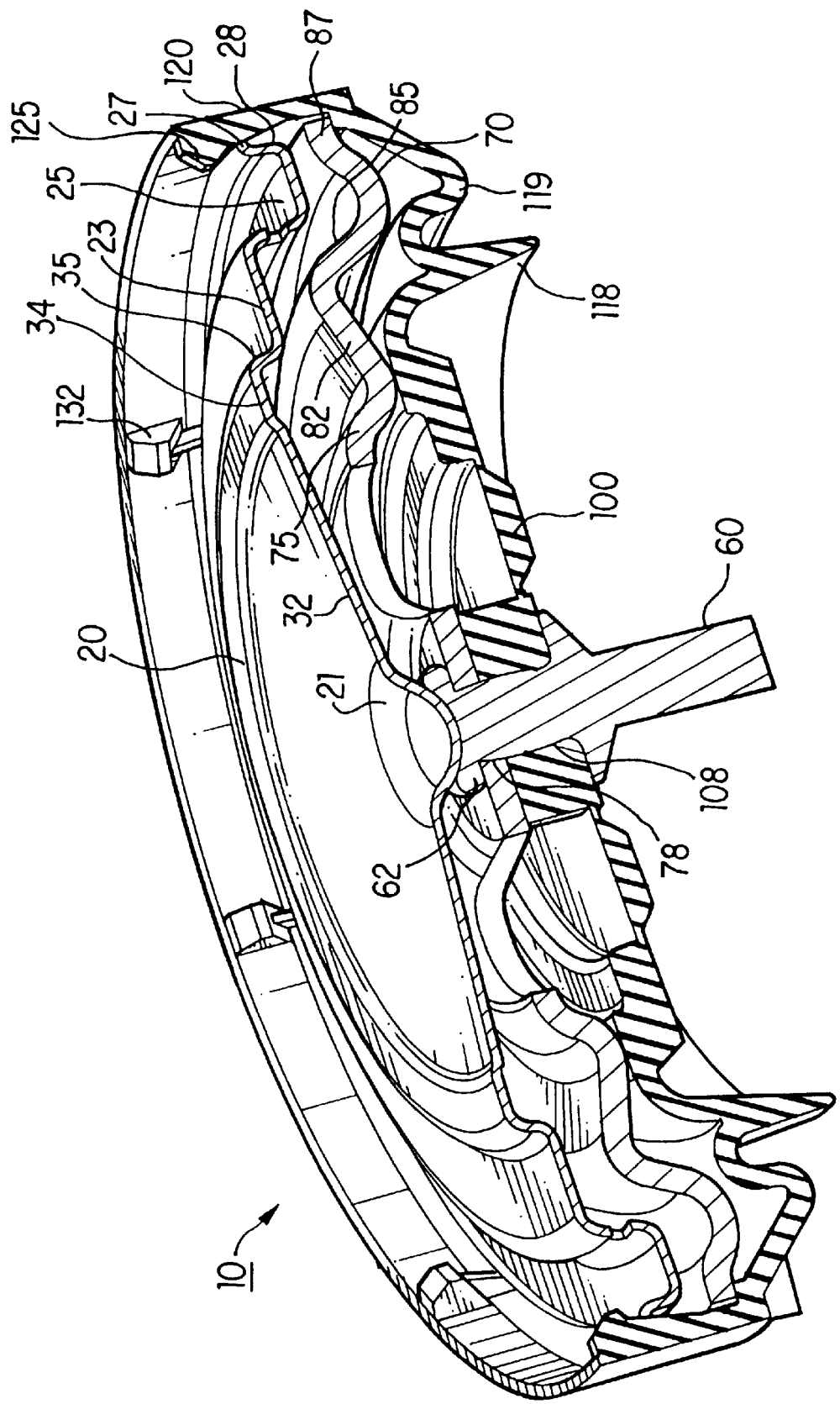
FIG. 1 is a cut-away view in perspective of the end cap assembly of the invention.
Figure 3:
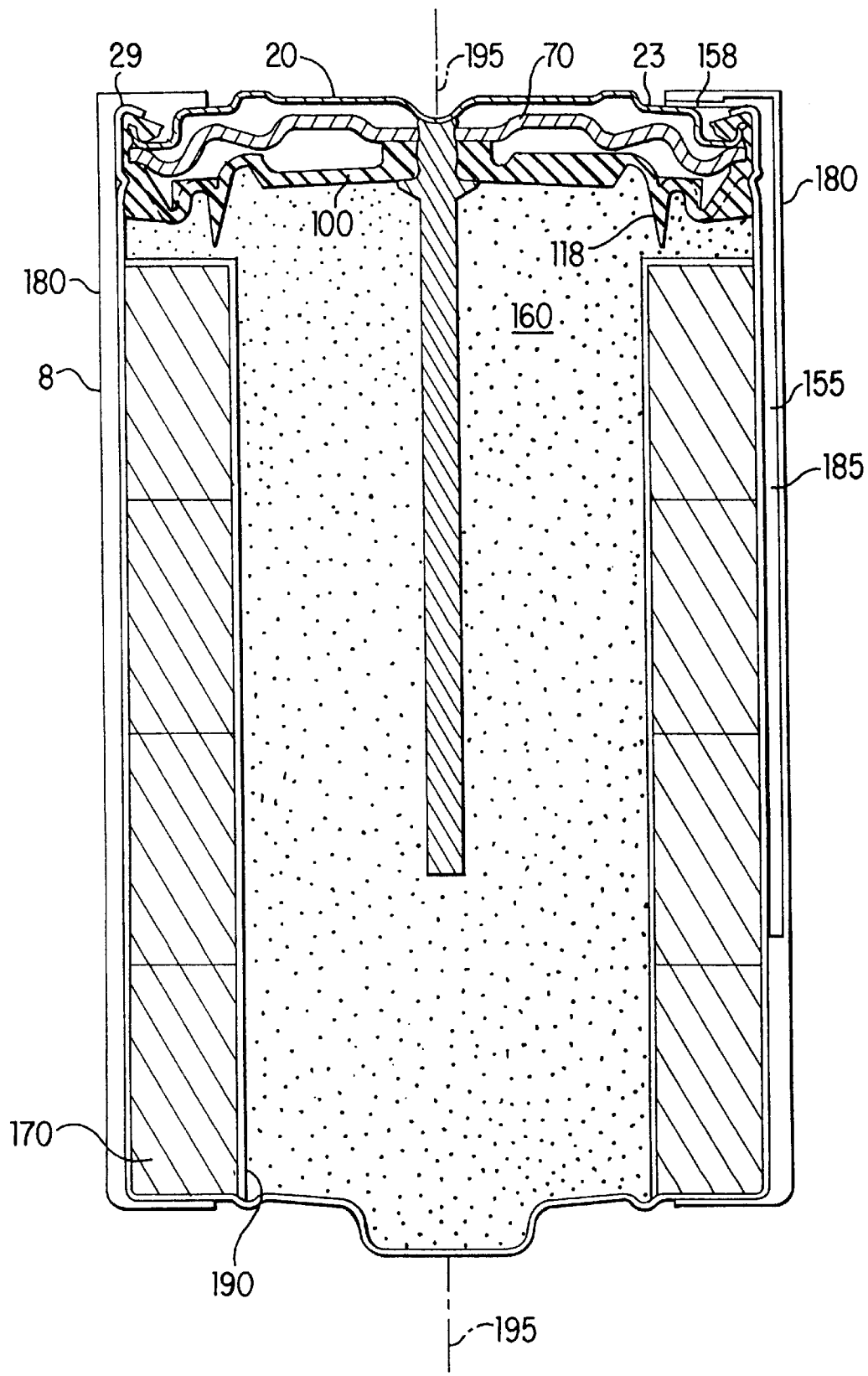
FIG. 3 is a cross section of an alkaline cell containing an end cap assembly of the invention.

A preferred structure of the end cap assembly 10 of the invention is illustrated in FIG. 1. A specific embodiment of the end cap assembly 10 integrated into an alkaline cell 8 is illustrated in FIG. 3. The end cap assembly 10 provides a seal for the open end of cell housing 90 and also has incorporated therein exposed terminal end cap 20 of the invention. Terminal end cap 20 functions as one of the cell's terminal's (negative terminal for alkaline cell) and is of a structure which enhances proper sealing of the cell and permits a condition tester 155 to be easily electrically connected thereto. The condition tester 155 is integrated into the label 180 for the cell to form a tester/label composite 158 (FIG. 3).

Figure 4:
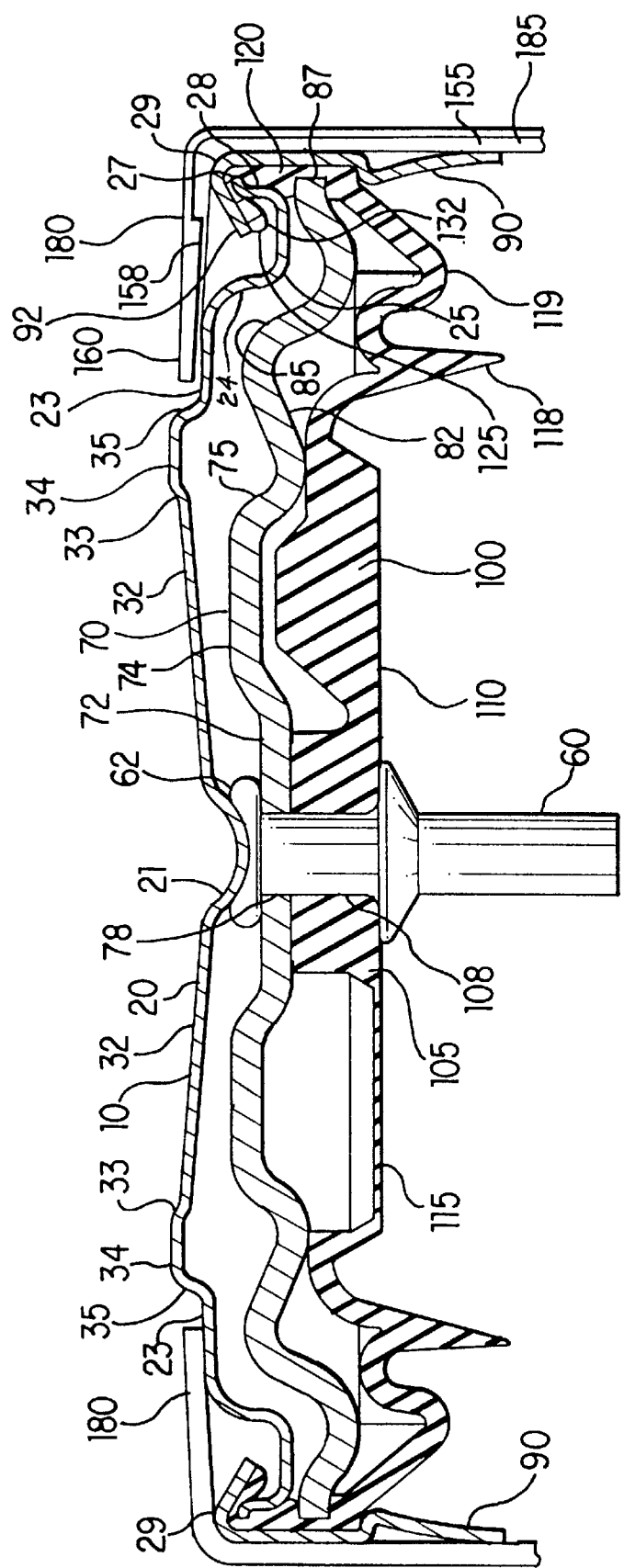
FIG. 4 is a cross section of the end cap assembly of the invention.

End cap assembly 10 of the invention, as best illustrated in FIGS. 1 and 4, is comprised of terminal end cap 20, a metal support disk 70, and an electrically insulating sealing grommet 100. The sealing grommet 100 and support disk 70 have an aperture 108 and 78, respectively, through their respective central portions for receiving a metal current collector 60. The head 62 of current collector 60 is in pressure contact with terminal end cap 20 when assembly 10 is integrated into cell 8. Preferably, current collector head 62 has a concave surface (FIG. 4), but its surface may also be flat or convex. The shape of depressed central region 21 of end cap 20 is designed to match the shape of head 62 as shown in FIG. 4. If the surface of head 62 is concave, as in FIG. 4, then the radius of depressed region 21 is desirably less than the radius of the concave surface of head 62.

Grommet 100 has a peripheral edge 120 which terminates at end 125. The terminal end cap 20 has a cup shaped edge 25 which terminates in upwardly extending peripheral leg 28. End cap assembly 10 is integrated into alkaline cell 8 by inserting it into the open end of cylindrical housing 90 and crimping the end 92 of housing 90 (FIG. 4) and end 125 of grommet 100 over peripheral leg 28 of end cap 20. When crimped the peripheral edge 120 of the grommet provides an electrically insulating seal between terminal end cap 20 and housing 90. Since housing 90 forms the opposite terminal of the cell such electrical insulating seal is necessary to prevent shorting of the cell. The seal must be tight enough to prevent electrolyte or other liquid material from leaking into the environment even if the cell is subjected to extremes in hot or cold climate. The terminal end cap 20 is of a structure which enhances sealing of the cell, provides permanent contact with current collector 60, and allows good electrical contact with a condition tester 155 integrated into label 180.

A condition tester for a cell can be integrated into the cell label 180 so that it lies wedged between the label and housing 90. The condition tester may preferably be a thermochromic type tester for the cell as described in U.S. Pat. Nos. 5,612,151 or 5,614,333 herein incorporated by reference. Such tester is shown schematically as tester 155 (FIG. 4) integrated into label 180 which is wrapped around the cell. Such tester has an electrically conductive layer shown schematically as conductive layer 158 (FIG. 4). There is an electrically insulating layer (not shown) between the conductive layer 158 and housing 90. A detailed design for tester 155 is described in the two referenced patents. When the ends of the conductive layer 158 or leads emanating therefrom are pressed into contact with the cell terminals heat is generated through the conductive layer. (The term "conductive layer" as used hereinafter and in the claims is intended to include an electrically conductive coating or conductive film as well as an electrically conductive coating or conductive film having conductive leads emanating therefrom.) The equilibrium surface temperature at any point along the conductive layer is a function of the watt density (power consumed per unit of conductive layer surface area). This in turn is a function of the cell voltage at time of testing. If the cell voltage is high enough the conductive layer will reach an equilibrium temperature sufficiently high to cause a change in color or appearance of an overlying thermochromic layer. This gives the viewer a visual effect enabling him to determine whether the cell is weak or strong. In such tester one end of the conductive coating may be in permanent electrical contact with the negative terminal 20 of alkaline cell 8. Alternatively, one end of the conductive layer may lie close to the terminal 20 but not actually contacting the terminal until finger pressure is applied to the portion of the label 180 overlying that end of the conductive layer. In either case if the tester 155 is integrated into a label 180 applied to a conventional alkaline cell 8, it is preferable that the contact surface 23 (FIG. 4) for the conductive layer 158 at the cell's negative terminal be flat. Other condition testers which are integrated into the cell label may also be used with the present invention as long as they have an electrically conductive layer which must be electrically connected to terminal 20. For example, the tester may be an electrochemical tester as disclosed in U.S. Pat. No. 5,339,024 or a coulometric tester disclosed in U.S. Pat. No. 5,627,472.

The label 180 with underlying tester 155, that is label/tester composite 185, is preferably applied to the cell by applying the label around the cell housing 90 and heat shrinking the label 180 over the cell shoulders 29. It has been determined that when contact surface 23 on terminal end cap 20 is flat more useful surface on the terminal is available for contacting conductive layer 158 and the contact is more easily and securely made. This results in more efficient and reliable contact between the conductive layer 158 and end cap terminal 20 if the tester is designed to be activated by application of manual finger pressure to region 160 of the label over the conductive layer end or alternatively if said conductive layer end is permanently welded to the end cap terminal 20 at contact surface 23.

Figure 2:
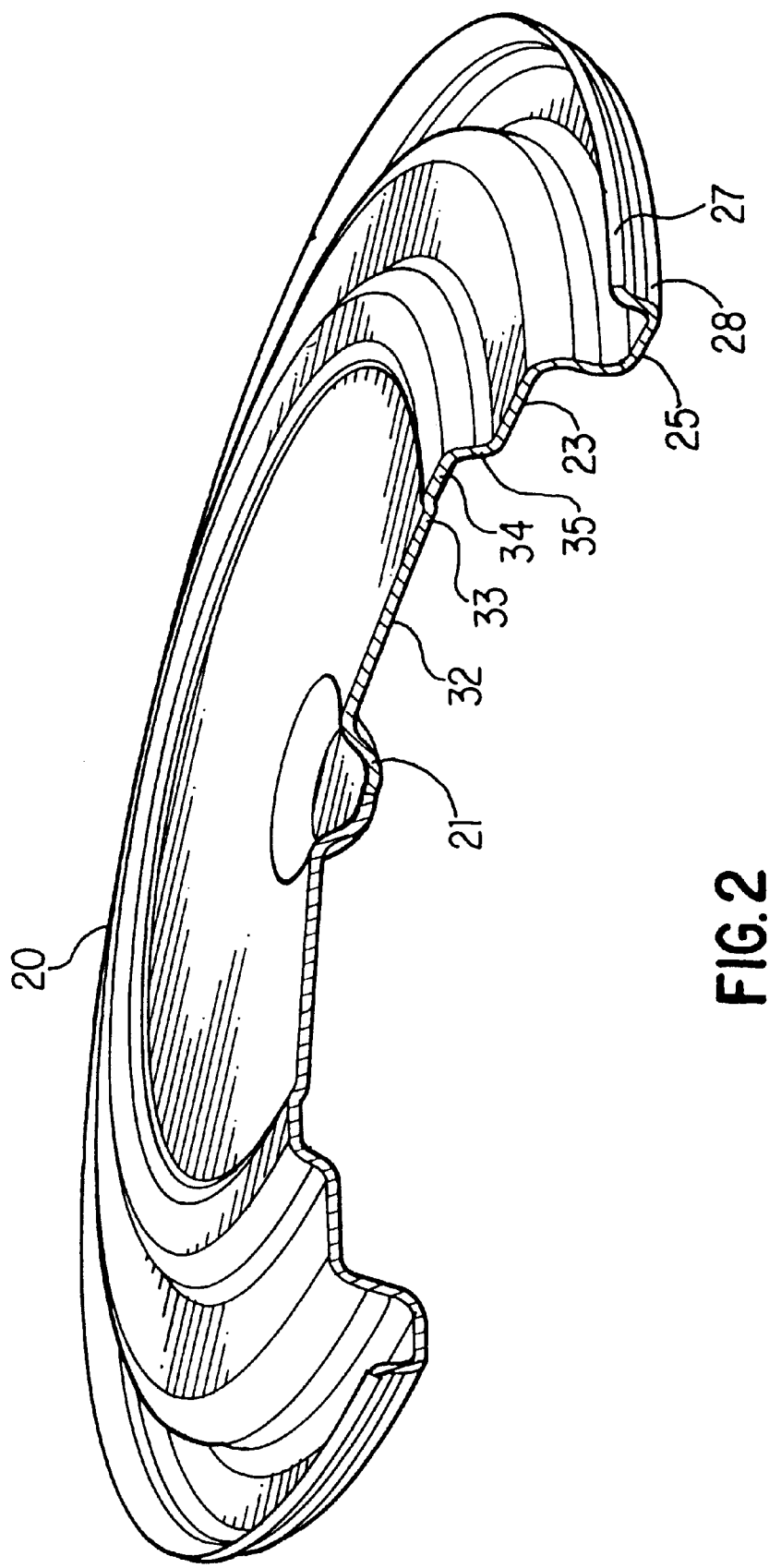
FIG. 2 is a partial perspective view of the terminal end cap of the invention.

Terminal end cap 20 is a disk of single piece metal construction. The disk surface is continuous but convoluted. The convolutions of end cap 20 as described herein may be applied to any size cell but are preferably applied to C and D size cells. The disk surface desirably is convoluted to the shape shown best in FIGS. 2 and 4. Terminal end cap 20 is a disk desirably having a depressed central region which appears as a crater 21. When viewed with the cell in vertical position with end cap 20 on top the end cap 20 surface extends upwardly from the edge of crater 21 (FIGS. 2 and 4) to form an annular upwardly extending surface arm 32. Surface arm 32 extends upwardly at an angle desirably of between about 1 and 20 degrees from horizontal. For D size cells surface arm 32 desirably extends upwardly at an angle of about 4 degrees and for C size cells surface arm 32 extends upwardly at an angle of about 10 degrees from horizontal. The upwardly extending surface arm 32 helps end cap 20 exert a desired downward vertical force when the end 92 of housing 90 is folded over peripheral edge 120 of end cap 20 during a first crimping step described below. Surface arm 32 extends upwardly to a point 33 (FIG. 4) approximately midway between the center and the peripheral edge of end cap 20. At point 33 the surface convolutes abruptly upwardly to form a raised circumferential strengthening rib 34 (FIGS. 2 and 4). The peripheral surface 35 of strengthening rib 34 slopes abruptly downwardly and then horizontally forming horizontal annular step 23 (FIGS. 2 and 4) which functions as a contact landing for the conductive layer 158 of condition tester 155. The height of peripheral surface 35 is about 0.5 mm for C and D size cells. The width of annular step 23 is preferably between about 2 and 3 mm for C and D size cells. Annular step 23 terminates in an abruptly downwardly sloping surface 24 which curves upward to form cup 25 (FIG. 4) at the peripheral end of end cap 20. Cup 25 is bounded by walls 24 and 120. Wall 120 forms the peripheral circumferential edge of end cap 20. Strengthening rib 34 is raised to form the most elevated surface on the end cap 20 as shown in FIGS. 2 and 4. The surface of strengthening rib 34 is higher than the surface of horizontal step 23 (FIG. 4). This serves to protect that portion of the tester 155 and label 180 in contact with step 23 from damage, for example, if cell 8 were dropped or if another surface contacted end cap 20, since contact in such case would likely be made against raised strengthening rib 34, not step 23. Also since strengthening rib 34 is higher than the central region 21 it serves to protect the central region 21 and the current collector 60 in electrical contact with central region 21 from damage if the cell is dropped or if another surface contacts end cap 20. Strengthening rib 34 also provides a visual break in the surface of end cap 20. Such visual break serves to obscure minor abrasion or stress marks which may be present on the end cap surface as a result of fabrication processing or handling. Annular step 23 preferably lies at about right angle to the longitudinal axis 195 of cell 8 and is desirably located at about the same level as cell shoulder 29.

Support disk 70 is designed to function as a radial spring when radial compressive forces are applied thereto during crimping of the open end of housing 90 which permanently secures end cap assembly 10 into the open end of the housing. A preferred design of support disk 70 is illustrated in FIGS. 1 and 4. The preferred design of support disk 70 herein is also shown in and described in detail in FIGS. 1A and 1B of commonly assigned U.S. Pat. No. 5,532,081 herein incorporated by reference. Support disk 70 is a metallic disk having a convoluted surface. The disk is characterized by a raised annular rib 74 extending from the depressed central region 72. A first downwardly sloping annular surface arm 75 extends from the edge of annular rib 74 (FIG. 4). The end of downwardly sloping arm 75 curves upwardly as shown in FIG. 4 to form a first upwardly sloping arm 82 which in turn at its end curves downwardly to form a second downwardly sloping surface arm 85. The second downwardly sloping surface 85 terminates in horizontal peripheral edge 87 which bites into peripheral edge 120 of grommet 100 during the crimping operation. The first upwardly sloping surface 82 is desirably at an angle of between about 2 and 30 degrees from horizontal, preferably between about 10 and 20 degrees from horizontal. The double convoluted surface defined by raised rib 74, and first and second downwardly sloping surfaces 75 and 85 with upwardly sloping surface 82 therebetween allows for greater radial compressive forces to be applied to end cap assembly 10 during the crimping operation. This in turn provides a tighter seal preventing leakage of electrolyte or other liquids form the cell even if the cell is exposed to extremes in hot and/or cold climate.

Grommet 100 is formed of a durable, heat resistant, electrically insulating plastic material, preferably of single piece construction. Desirably grommet 100 is formed of a polyamide, preferably nylon. Grommet 100 has a central boss 105 having an aperture therethrough for current collector 60. Grommet 100 has one or more thin membrane regions 115 which is designed to rupture in the event that gas pressure within the cell builds up and exceeds a predetermined value. Under such circumstances membrane 115 will rupture allowing gas to escape from the interior of the cell. Grommet 100 may contain one or more radial ribs 110 jutting out from membrane 115. Such ribs are thicker than membrane 115 and serve to reinforce the membrane. Grommet 100 also may have a circumventing ring 118 jutting out from its bottom surface as shown in FIG. 1. When end cap assembly 10 is applied to seal the open end of an alkaline cell 8 (FIG. 3) such ring pushes into anodic material within the cell and helps to stabilize the end cap assembly 10.

The end cap assembly 10 is advantageously used to seal an electrochemical cell having a cylindrical housing with one open end. The end cap assembly 10 of the invention has particular utility in sealing the open end of alkaline cells irrespective of size, but particularly C and D size alkaline cells. The end cap assembly 10 has particular application to sealing C and D size alkaline cells having a thermochromic condition tester or other tester having an electrically conductive layer therein integrated into its label. The end cap assembly as applied to C or D size zinc/MnO$_2$ alkaline cell is shown in FIG. 3. The basic chemistry and operation of conventional zinc/MnO$_2$ alkaline cells are well know in the art. The cell has an anodic core 160 comprising zinc particles and an electrolyte comprising potassium hydroxide, and a cathode 170 comprising compacted manganese dioxide and a porous separator 190 therebetween which may typically be of cellulosic, or rayon material as is well known in the art. More detailed representative compositions for alkaline cells are described, for example, in U.S. Pat. No. 5,401,590 herein incorporated by reference.

The end cap assembly 10 of the invention is applied to sealing the open end of housing 90 of an alkaline cell 8 by inserting it into said open end after the anode material, cathode material, electrolyte and separator have been included. End cap assembly 10 is inserted so that the current collector 60 penetrates into the anodic material 160. The open end of the housing is then mechanically crimped to hold end cap assembly 10 tightly and permanently in place. The crimping may advantageously be accomplished in two steps. In the first crimping step the top edge 92 of housing 90 together with the top edge 125 of grommet 100 is mechanically folded over peripheral edge 120 of the terminal end cap 20. In this step the protrusions or snaps 132 (FIG. 1) along the inside surface of peripheral edge 120 of grommet 100 fold over the peripheral leg 28 of end cap 20 thereby locking the end cap assembly 10 in place in the longitudinal direction and providing electrical insulation between housing 90 and end cap 20. During this first crimping step the above described design of end cap 20 causes said end cap to be vertically deflected downwardly (FIG. 4). In effect the first crimping step causes a preloading the end cap 20 downwardly, that is, in the longitudinal direction towards the cell interior. When top edge 92 of housing 90 is folded over peripheral edge 120 of grommet 100 a shoulder 29 is formed along the edge of housing 90 as shown in FIG. 4. Annular step 23 in the surface of end cap 20 is positioned so that after the top edge 92 of housing 90 is folded over peripheral edge 120 of grommet 100 said annular step 23 is at the same level as shoulder 29. In a second step (radial crimping step) radial forces are applied radially inwardly along the outside surface of housing 90 in the region of end cap assembly 10. During this second step (radial crimping) housing 90 and support disk 70 are compressed radially inwardly causing both the edge 87 of support disk 70 and the end 27 of peripheral leg 28 to bite into the peripheral edge 120 of grommet 100. Also, the above described design of support disk 70 causes support disk 70 to vertically deflect upwardly during said second crimping step as radial forces are applied inwardly. The downward vertical deflection of end cap 20 during the first crimping step together with the upward vertical deflection of support disk 70 during the second crimping step causes sufficient contact pressure between the head 62 of current collector 60 and end cap 20 at contact region 21. The resulting high contact pressure between current collector head 62 and end cap 20 assures that the current collector 60 stays in permanent electrical contact with end cap 20 even though the cell may be exposed to extreme variations in hot and cold climatic conditions.

While there may be a variety of suitable materials for the components of end cap assembly 10, preferred materials are as follows: End cap 20 is preferably composed of nickel plated low carbon steel having a thickness of about 0.25 mm. Support disk 70 is preferably composed of low carbon cold rolled steel. Grommet 100 is desirably composed of a polyamide, preferably nylon. Current collector 60 can be selected from a variety of known electrically conductive metals found to be useful as current collector materials, for example, brass, tin plated brass, bronze, copper or indium plated brass.

Although the invention has been described with reference to specific embodiments, other embodiments may be possible within the concept of the invention. It is, therefore, not intended that the invention be limited to the specific embodiments, but rather is defined by the claims and equivalents thereof.

What is claimed is:

1. In an electrochemical cell having an open ended cylindrical housing and an end cap assembly inserted therein closing said housing, said cell having a positive and a negative terminal and a label around the cell housing, said end cap assembly comprising a terminal end cap and an electrically insulating sealing member, said sealing member having an elongated electrically conductive current collector passing therethrough, the current collector being in electrical contact with the end cap and the sealing member electrically insulating the end cap from said housing, and the edge of said housing being crimped over the peripheral edge of said end cap to form a cell shoulder along the line of crimp, the improvement comprising:

said end cap having a portion of its surface flat and at about right angle to the cell's longitudinal axis and at about the same level as said cell shoulder, said flat surface providing an electrical contact region for an electrically conductive layer of a condition tester for the cell;

wherein at least a portion of said tester is attached to the inside surface of said label; wherein said flat portion of said terminal end cap forms an annular step; wherein said terminal end cap has a depressed central region and an upwardly deflecting annular surface extending from the edge of said central region at an angle of between about 1 and 20 degrees from horizontal as measured when said cell is in vertical position with said end cap at top; and wherein said annular step is located between said upwardly deflecting surface and the peripheral edge of said end cap; wherein said terminal end cap surface is contoured to provide a raised annular rib located between said upwardly extending surface and said step wherein said raised rib forms the highest point on said terminal end cap when said cell is oriented in vertical position with said end cap at the top, wherein said step is located below said raised rib.

2. In an electrochemical cell having an open ended cylindrical housing and an end cap assembly inserted therein closing said housing, said cell having a positive and a negative terminal and a label around the cell housing, said end cap assembly comprising a terminal end cap and an electrically insulating sealing member, said sealing member having an elongated electrically conductive current collector passing therethrough, the current collector being in electrical contact with the end cap and the sealing member electrically insulating the end cap from said housing, and the edge of said housing being crimped over the peripheral edge of said end cap to form a cell shoulder along the line of crimp, the improvement comprising:

said end cap having a portion of its surface flat and at about right angle to the cell's longitudinal axis and at about the same level as said cell shoulder, said flat surface providing an electrical contact region for an electrically conductive layer of a condition tester for the cell;

wherein at least a portion of said tester is attached to the inside surface of said label; wherein said flat portion of said terminal end cap forms an annular step; wherein said terminal end cap has a depressed central region and an upwardly deflecting annular surface extending from the edge of said central region at an angle of between about 1 and 20 degrees from horizontal as measured when said cell is in vertical position with said end cap at the top; and wherein said annular step is located between said upwardly deflecting surface and the peripheral edge of said end cap; wherein said terminal end cap surface is contoured to provide a raised annular rib located between said upwardly extending surface and said step wherein said raised rib forms the highest point on said terminal end cap when said cell is oriented in vertical position with said end cap at the top, wherein said step is located below said raised rib; wherein the edge of said label is heat shrunk over said cell shoulder with an end of the conductive layer of said tester positioned over said step; wherein an end of said conductive layer of the tester is permanently electrically connected to said step.

3. A terminal end cap for an electrochemical cell, said terminal end cap having a convoluted surface wherein a portion of said surface is flat and at about right angle to the axis of said end cap, said flat portion of surface providing an electrical contact region for a condition tester;

wherein the electrical contact region for the tester is applied to a label for the cell; wherein said flat portion of said terminal end cap forms an annular step; wherein said end cap has a depressed central region and an upwardly deflecting annular surface extending from the edge of said central region at an angle of between about 1 and 20 degrees from horizontal as viewed when the axis of said end cap is vertical; and wherein said annular step is located between said upwardly deflecting surface and the peripheral edge of said terminal end cap; wherein said terminal end cap surface is contoured to provide a raised annular rib located between said upwardly deflecting surface and said step wherein said raised rib forms the highest point on said terminal end cap as viewed when said upwardly deflecting surface forms the top of said end cap and the axis of said end cap is vertical.

4. A terminal end cap for an electrochemical cell, said terminal end cap having a convoluted surface wherein a portion of said surface is flat and at about right angle to the axis of said end cap, said flat portion of surface providing an electrical contact region for a condition tester;

wherein the electrical contact region for the tester is applied to a label for the cell; wherein said flat portion of said terminal end cap forms an annular step; wherein said end cap has a depressed central region and an upwardly deflecting annular surface extending from the edge of said central region at an angle of between about 1 and 20 degrees from horizontal as viewed when the axis of said end cap is vertical; and wherein said annular step is located between said upwardly deflecting surface and the peripheral edge of said terminal end cap; wherein said terminal end cap surface is contoured to provide a raised annular rib located between said upwardly deflecting surface and said step, wherein said raised rib forms the highest point on said terminal end cap and said step is located below said raised rib as viewed when said upwardly deflecting surface forms the top of said end cap and the axis of said end cap is vertical; wherein the electrical contact region for the tester comprises an electrically conductive layer integrated into the label for a cell and a portion of said conductive layer is permanently electrically connected to said step.

* * * * *